(12) United States Patent
Kondo

(10) Patent No.: US 6,622,695 B2
(45) Date of Patent: Sep. 23, 2003

(54) INTAKE CONTROL SYSTEM OF INTERNAL COMBUSTION ENGINE

(75) Inventor: Jiro Kondo, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/293,336

(22) Filed: Nov. 14, 2002

(65) Prior Publication Data

US 2003/0094156 A1 May 22, 2003

(30) Foreign Application Priority Data

| Nov. 20, 2001 | (JP) | ............................... 2001-355010 |
| Nov. 28, 2001 | (JP) | ............................... 2001-363119 |
| Nov. 28, 2001 | (JP) | ............................... 2001-363142 |
| Nov. 28, 2001 | (JP) | ............................... 2001-372540 |

(51) Int. Cl.$^7$ ................................................ F02D 9/10
(52) U.S. Cl. .................. 123/336; 123/399; 251/129.11; 251/305
(58) Field of Search .................. 123/336, 399, 123/337; 251/129.11, 305

(56) References Cited

U.S. PATENT DOCUMENTS

| 5,957,108 A | * | 9/1999 | Kato ........................... 123/336 |
| 6,047,680 A | * | 4/2000 | Shimura et al. ............ 123/399 |
| 6,360,719 B1 | * | 3/2002 | Uitenbroek .................. 123/337 |
| 2002/0023620 A1 | * | 2/2002 | Paffrath ....................... 123/336 |
| 2002/0050268 A1 | * | 5/2002 | Deguchi ...................... 123/336 |

FOREIGN PATENT DOCUMENTS

| JP | 4-292528 | 10/1992 |
| JP | 5-156950 | 6/1993 |
| JP | 6-58192 | 3/1994 |
| JP | 8-218906 | 8/1996 |
| JP | 8-232712 | 9/1996 |
| JP | 9-170458 | 6/1997 |

* cited by examiner

Primary Examiner—Erick Solis
(74) Attorney, Agent, or Firm—Nixon & Vanderhye P.C.

(57) ABSTRACT

An intake control system of an internal combustion engine comprises an intake control valve disposed in an intake passage of each cylinder of the engine and a rotary solenoid actuator that drives the intake control valve to open and to close. Fan-shaped parts of a rotor and projecting parts of a stator of the actuator form air gaps in a circumferential direction. Circumferential length of the air gaps change with rotation of the rotor. Electromagnetic coils are disposed in the stator and generate magnetic flux mainly through the air gaps that are shortened when the rotor is rotated by supplying current to the electromagnetic coils. A support shaft of the intake control valve is connected with a spring that holds the intake control valve at a neutral position when the electromagnetic coils are supplied with no current.

11 Claims, 10 Drawing Sheets

INTAKE CONTROL SYSTEM OF INTERNAL COMBUSTION ENGINE

CROSS REFERENCE TO RELATED APPLICATION

This application is based on and incorporates herein by reference Japanese Patent Application No. 2001-355010 filed on Nov. 20, 2001, Japanese Patent Application No. 2001-363119 filed on Nov. 28, 2001, Japanese Patent Application No. 2001-363142 filed on Nov. 28, 2001 and Japanese Patent Application No. 2001-372540 filed on Dec. 6, 2001.

BACKGROUND OF THE INVENTION

1. Field of the Invention

The present invention relates to an intake control system of an internal combustion engine, the intake control system being capable of controlling quantity of intake air for each cylinder by controlling opening and closing of intake control valves disposed in intake passages of the engine.

2. Description of Related Art

Conventionally, a known intake control system, which is provided with intake control valves disposed in intake passages of an internal combustion engine, controls quantity of intake air for each cylinder by controlling opening and closing of the intake control valves respectively, besides a throttle valve disposed in the engine.

In such a kind of intake control system, the intake control valves disposed in the intake passages of the respective cylinders are capable of being controlled to open and to close by actuators respectively and independently. Therefore, it is possible to prevent back flow of intake air, which occurs in an intake stroke when an engine revolution is in a low speed range, by controlling the opening and closing timing of the intake control valves in correspondence with operating conditions of the engine. As a result, an output of the engine is improved. In addition, it is possible to reduce a pumping loss, which increases when the engine is under a partial load especially when the engine is idling, by controlling the opening and closing timing of the intake control valves in correspondence with operating conditions of the engine. Thus, fuel consumption is reduced, as is commonly known. When the engine is under a partial load, especially when the engine is idling, intake air is drawn through one port alone. Therefore, swirls or tumbles are generated in the cylinder and atomization of fuel is improved. Accordingly, the fuel is mixed with air efficiently, and fuel combustion is improved.

Conventionally, a 90-degree rotating type rotary solenoid actuator, an R/S actuator, is used as an actuator that drives the intake control valve to open and to close. The R/S actuator holds the intake control valve at a neutral position where an intake passage is half opened, when current is not supplied thereto. When the current is supplied, the R/S actuator drives the intake control valve from the neutral position to a direction to open or to close the intake control valve in correspondence with strength and direction of the current.

In such a case in which the R/S actuator that holds the intake control valve at the neutral position when the current is not supplied thereto is employed, safety is ensured because the engine is capable of operating without closing the intake passage even if the current is not supplied to the R/S actuator because of a breakdown and the like. In addition, the opening and closing directions of the intake control valve are changed by altering the direction of the current supply. Therefore, the intake control valve is capable of being driven from a full opening position to a full closing position quickly, and vice versa.

However, when the R/S actuator is used to control the opening and closing of the intake control valve, the R/S actuator needs the current supply invariably even when the intake control valve is held at a full opening position and the opening and closing control is not performed. As a result, power consumption is increased.

As a solution for such a problem, Japanese Patent Laid-Open Publication No. H06-58192 discloses an intake control system that reduces the power consumption by reducing current supply to an R/S actuator while an intake valve is closed, as intake characteristics of an engine are not affected even if the intake control valve is opened or closed while the intake valve is closed.

FIG. 8A is a longitudinal cross-sectional view showing an intake control device of the conventional intake control system and FIG. 8B is a cross-sectional view showing the intake control device along the line VIIIB—VIIIB in FIG. 8A. The conventional R/S actuator 20 that controls the intake control valve 10 comprises a support shaft 21, a magnetic member 22, electromagnetic coils 23, 24, permanent magnets 25, 26 and the like as shown in FIGS. 8A and 8B. The support shaft 21 connected with a support shaft 11 of the intake control valve 10 is held in a casing 27 rotatably. The magnetic member 22 is press-fitted around the support shaft 21 and is formed with opposing magnetic poles symmetrically in a radial direction. The pair of electromagnetic coils 23, 24 are disposed on inner walls of the casing 27, facing each other across the magnetic member 22. The pair of permanent magnets 25, 26 are disposed on the inner walls of the casing 27 so that the permanent magnets 25, 26 face each other across the magnetic member 22, and the alignment thereof is perpendicular to that of the electromagnetic coils 23, 24.

When the electromagnetic coils 23, 24 are supplied with current, the magnetic member 22 is rotated to a position determined by magnetic poles provided by the electromagnetic coils 23, 24 and magnetic poles provided by the permanent magnets 25, 26. As a result, the support shaft 21 integrated with the magnetic member 22 is rotated, and the intake control valve 10 is rotated from a neutral position, a half opening position, toward a full opening position or a full closing position.

If the current supply to the electromagnetic coils 23, 24 is cut off, the magnetic member 22 is attracted by the magnetic poles of the permanent magnets 25, 26 alone. Accordingly, the intake control valve 10 is rotated to the neutral position and is stabilized there.

As explained above, the conventional R/S actuator 20 is a permanent magnet type torque motor. The permanent magnets 25, 26 for holding the rotor 21 at the neutral position are disposed in the stator of the conventional R/S actuator 20. The magnetic member 22 is disposed around the rotor 21. The rotor 21 is rotated by supplying current to the electromagnetic coils 23, 24 and is rotated from the half opening position to the full closing position or the full opening position.

Generally, mechanical inertia of its motor should be small because the R/S actuator for controlling the opening and closing of the intake control valve has to operate quickly. Therefore, large magnets are not applicable in the motor, and large torque is not acquired even if the current is supplied. Accordingly, when the rotor of the motor is held at a full closing position or at a full opening position, large current is required to hold the rotor, because a torque constant, torque generated per unit current, is small. As a result, reduction of the power consumption is not attainable.

In addition, the conventional R/S actuator uses detent torque when returning to the neutral position. Therefore, improvement of its response cannot be expected. Moreover, there are some more disadvantages, such as a high-cost, because the permanent magnets are used in the stator.

Japanese Patent Laid Open Publication H04-292528 discloses another intake control system that controls intake control valves by R/S actuators. The intake control system controls quantity of intake air by opening and closing the intake control valves once in every intake stroke in compliance with a command from an electronic control unit (ECU). However, the intake control system is not provided with sensors such as an opening degree sensor or a coil temperature sensor. Therefore, the intake control system is controlled in an open loop control and is only capable of performing the intake control with timing that is programmed in advance. Accordingly, the intake control system is not capable of regulating quantity of intake air by controlling the intake control valves at the optimum timing. As a result, reduction of the fuel consumption and improvement of the output of the engine are not attained sufficiently.

The intake control system disclosed in Japanese Patent Laid Open Publication H04-292528 basically closes the intake control valve in an early stage of an intake stroke as shown in FIG. 16 to reduce pumping loss caused when the engine is under a partial load, especially when the engine is idling. In FIG. 16, a broken line (f) represents an operation of the exhaust valve and a solid line (g) represents an operation of the intake valve, and a line (h) represents an operation of the intake control valve. $P_O$ represents the full opening position and $P_C$ represents the full closing position of the intake control valve.

However, in a scheme explained above, in order to reduce the pumping loss, the intake control valve is operated to open and to close once in one cycle of the engine, synchronized with the cycle of the engine, as shown in FIG. 16. The intake control valve is open during an overlapping period "$T_{OL}$" in which the intake valve and the exhaust valve, which are driven by high-speed cams having profiles adapted for high-speed, are open together. Accordingly, exhaust gas could flow back into an intake passage especially when the engine is under a partial load. As a result, the fuel combustion is deteriorated and the fuel consumption is increased.

SUMMARY OF THE INVENTION

It is therefore an object of the present invention to provide an intake control system of an internal combustion engine, wherein the intake control system improves response and reduces power consumption.

It is another object of the present invention to provide an intake control system of an internal combustion engine, wherein the intake control system improves controlling accuracy of intake control valves and controls quantity of intake air at optimum timing so that fuel consumption is reduced and output of the engine is improved.

It is also another object of the present invention to provide an intake control system of an internal combustion engine, wherein the intake control system reduces pumping loss in an intake stroke and prevents exhaust gas from flowing back into intake passages to prevent deterioration of fuel combustion and to reduce fuel consumption.

According to an aspect of the present invention, an intake control system of an internal combustion engine comprises intake control valves disposed in respective cylinders of the engine and rotary solenoid actuators, R/S actuators, that control the intake control valves to open and to close. A stator and a rotor of the R/S actuator provide air gaps therebetween and the air gaps change length thereof in a rotational direction of the rotor. A plurality of electromagnetic coils are disposed in the stator so that magnetic flux is generated mainly through the air gaps formed from the rotor to a direction in which the rotor is to be rotated among the air gaps. A spring is connected with a support shaft of the intake control valve and holds the intake control valve at a neutral position, a half opening position, when the R/S actuator is not supplied with the current. Thus, the intake control system that has a high response and is capable of reducing the power consumption is provided.

According to another aspect of the present invention, a stator of an R/S actuator of an intake control system has a plurality of electromagnetic coils disposed in four radial directions from a rotor in an interval of generally 90 degrees. The electromagnetic coils generate magnetic flux mainly in a pair of quarter spaces across the rotor in the stator when the electromagnetic coils are supplied with the current. The spaces where the magnetic flux is generated are rotated by changing the directions of the current supplied to the electromagnetic coils. Thus, holding force to hold the intake control valve at a full closing position or at a full opening position is easily acquired. And thus, the stator and the rotor attract and stick to each other directly in direction of rotation of the rotor. As a result, the response of the intake control valve is improved and the power consumption is reduced.

According to another aspect of the present invention, an intake control valve of an intake control system is opened after an exhaust valve is closed so that the intake control valve is not opened in an overlapping period in which an intake valve and the exhaust valve are open together. Accordingly, exhaust gas is prevented from flowing back into an intake passage and destabilization of fuel combustion is prevented. Moreover, the intake control valve is closed before the intake valve is closed. Therefore, a spit back of fresh air, a flowing back of intake air, is prevented.

According to another aspect of the present invention, an intake control system of an internal combustion engine calculates a target operation timing of an opening and closing operation of intake control valves with using a map and based on an accelerator opening degree and rotation speed of the engine. In addition, the intake control system calculates an error between the target operation timing and an actual operation timing detected by opening degree sensors disposed in the intake control valves, and operates the intake control valves in the next opening and closing operation at the operation timing of which error is corrected. Thus, variation in the actual operations is inhibited, and quantity of the intake air is controlled at the suitable timing. As a result, the fuel consumption is reduced and the output of the engine is improved. Moreover, the intake control system is not provided with a main control valve for controlling the entire intake air. The intake control system is provided with the intake control valves disposed in the respective cylinders. Therefore, the intake control system is capable of controlling the intake air precisely per each cylinder.

According to another aspect of the present invention, an intake control system performs a first opening and closing control and a second opening and closing control of the intake control valve in a cycle of an engine. In the first opening and closing control, after an overlapping period of an intake valve and an exhaust valve ends, the intake control valve is driven from a full closing position to a full opening position, and after necessary intake air is drawn, the intake control valve is driven from the full opening position to the full closing position before the intake valve closes. In the second opening and closing control, after the intake valve closes, the intake control valve is driven from the full closing position to the full opening position, and after the pressure in an intake passage becomes the atmospheric pressure, the intake control valve is driven from the full opening position to the full closing position before the intake valve opens. Thus, the intake control valve opens when the exhaust valve is closed after the overlapping period ends, and therefore, exhaust gas is prevented from flowing back into the intake passage. As a result, deterioration of fuel combustion is prevented. In addition, the intake control valve is opened momentarily after the intake valve is closed so that the intake stroke starts after the pressure in the intake passage is atmospheric pressure. As a result, pumping loss is reduced.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENT

First Embodiment

Figure 1:
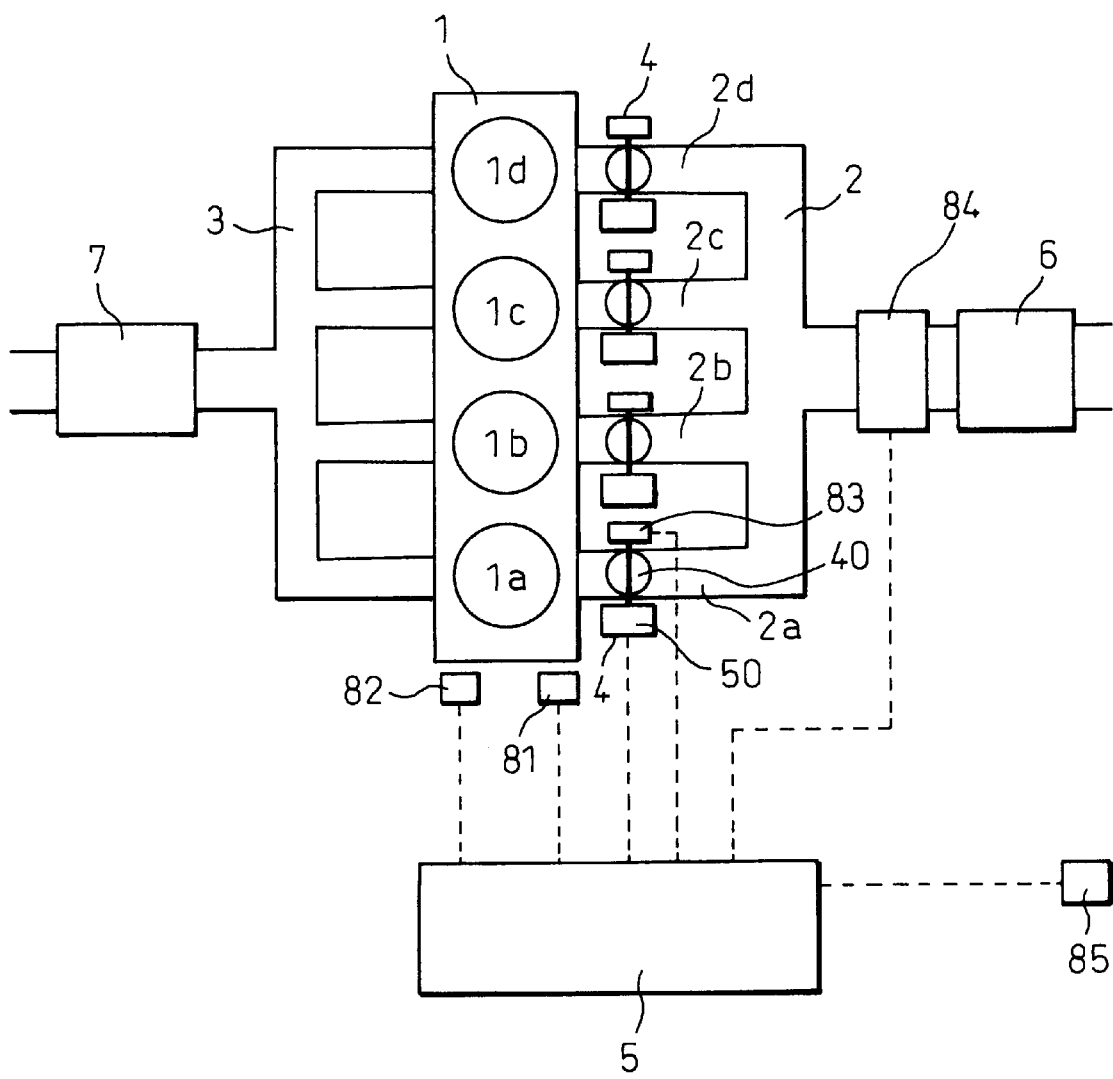
FIG. 1 is an explanatory diagram showing a system architecture of an internal combustion engine employing an intake control system according to a first embodiment of the present invention.

As shown in FIG. 1, a system according to the first embodiment comprises a four-cylinder internal combustion engine 1, an intake passage 2, an exhaust passage 3, intake control devices 4 disposed in respective intake manifolds 2a, 2b, 2c, 2d connected with respective cylinders of the engine 1, an electronic control unit (ECU) 5 that controls the intake control devices 4, and the like.

The engine 1 has four cylinders 1a, 1b, 1c, 1d. Each cylinder 1a, 1b, 1c, 1d has an intake valve and an exhaust valve that are opened and closed by high-speed cams having profiles adapted for high-speed. The intake control device 4 is disposed in each intake manifold 2a, 2b, 2c, 2d in the upstream of the intake valve of each cylinder 1a, 1b, 1c, 1d. An air cleaner 6 is disposed in the intake passage 2 in the upstream of the intake manifolds 2a, 2b, 2c, 2d. The intake control system according to the embodiment is not provided with a throttle valve, which is opened and closed by accelerator operation by a driver for controlling the entire intake air. A catalytic part 7 is disposed in the exhaust passage 3 in the downstream of the exhaust valves of the respective cylinders 1a, 1b, 1c, 1d.

The engine 1 further comprises a crank angle sensor 81, a cylinder determining sensor 82, opening degree sensors 83, an air flow meter 84, an accelerator opening degree sensor 85 and the like as sensors to detect operating conditions of the engine 1. The crank angle sensor 81 outputs a pulse signal when a piston of each cylinder 1a, 1b, 1c, 1d is at a top dead center (TDC). The cylinder determining sensor 82 detects torque or combustion per each cylinder. The opening degree sensor 83 detects opening degree of an intake control valve 40 of the intake control device 4. The air flow meter 84 detects quantity of entire intake air drawn by the engine 1. The accelerator opening degree sensor 85 detects depressed degree of an accelerator pedal. Detection signals from the respective sensors are outputted to the ECU 5.

The ECU 5 is constructed as a calculation circuit with CPU, ROM, RAM and the like. The ECU 5 is connected with an input and output part through a common path and performs input and output with the exterior. The detection signals from the respective sensors are inputted to the ECU 5, and the ECU 5 outputs control signals to rotary solenoid actuators 50, R/S actuators, of the intake control devices 4.

Figure 2:
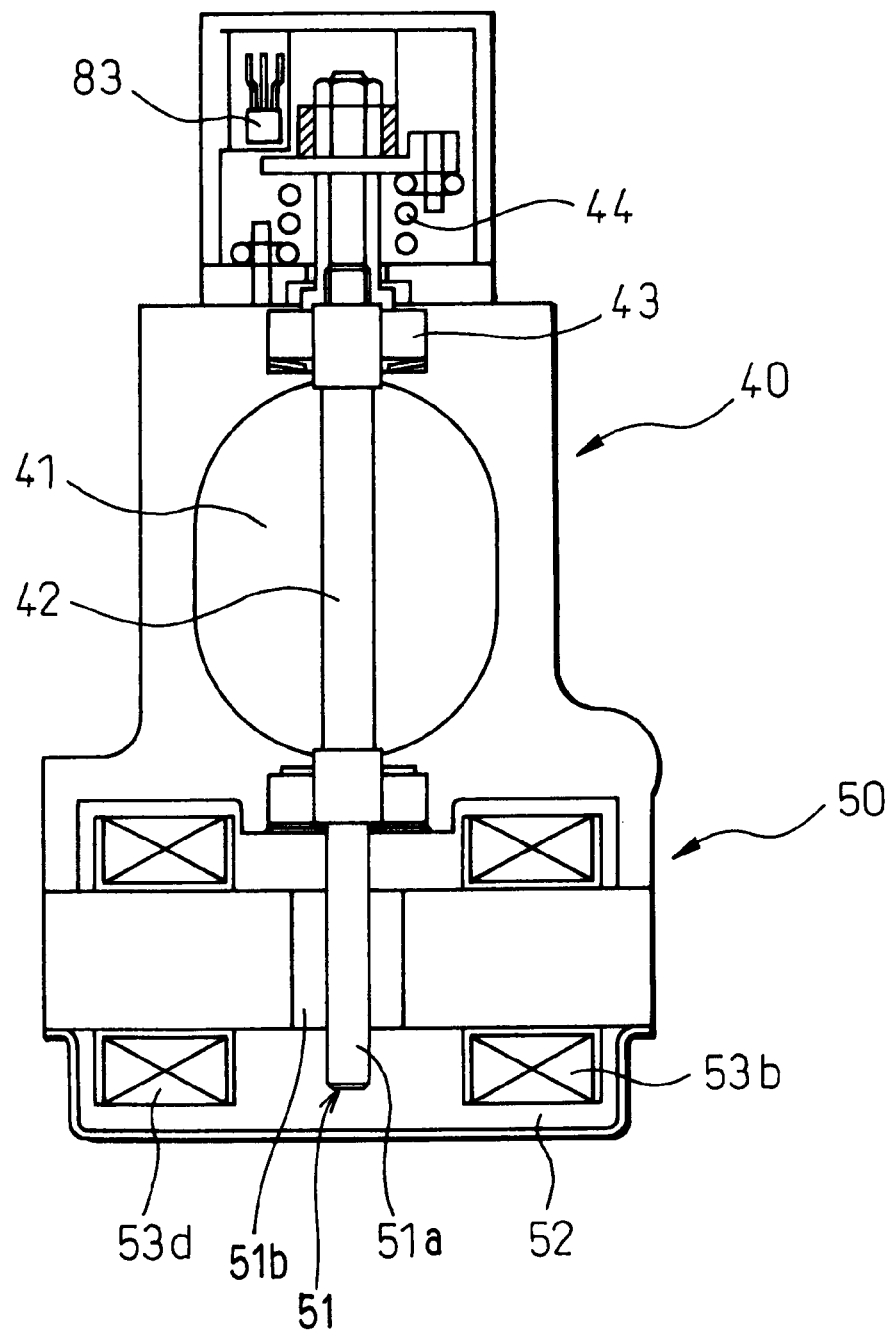
FIG. 2 is a longitudinal sectional view showing an intake control device of the intake control system according to the first embodiment of the present invention.

As shown in FIG. 2, the intake control device 4 comprises the intake control valve 40, the R/S actuator 50 and the like. The intake control valve 40 comprises a butterfly-shaped circular valve plate 41, a valve body, disposed in each intake manifold 2a, 2b, 2c, 2d. The circular valve plate 41 is connected with a support shaft 42 and is held rotatably. The circular valve plate 41 rotates around the axis of the support shaft 42, retaining an extremely narrow clearance from the inner surface of each manifold 2a, 2b, 2c, 2d, without contacting the inner surface. A first end of the support shaft 42 is held by each intake manifold 2a, 2b, 2c, 2d through a bearing 43, and a second end thereof is connected with the R/S actuator 50.

A spring 44 is connected with the first end of the support shaft 42. The spring 44 holds the circular valve plate 41 at a neutral position, a half opening position, when the R/S actuator 50 is not supplied with current. The intake control valve 40 further comprises the opening degree sensor 83 that detects the opening degree of the circular valve plate 41.

Figure 3:
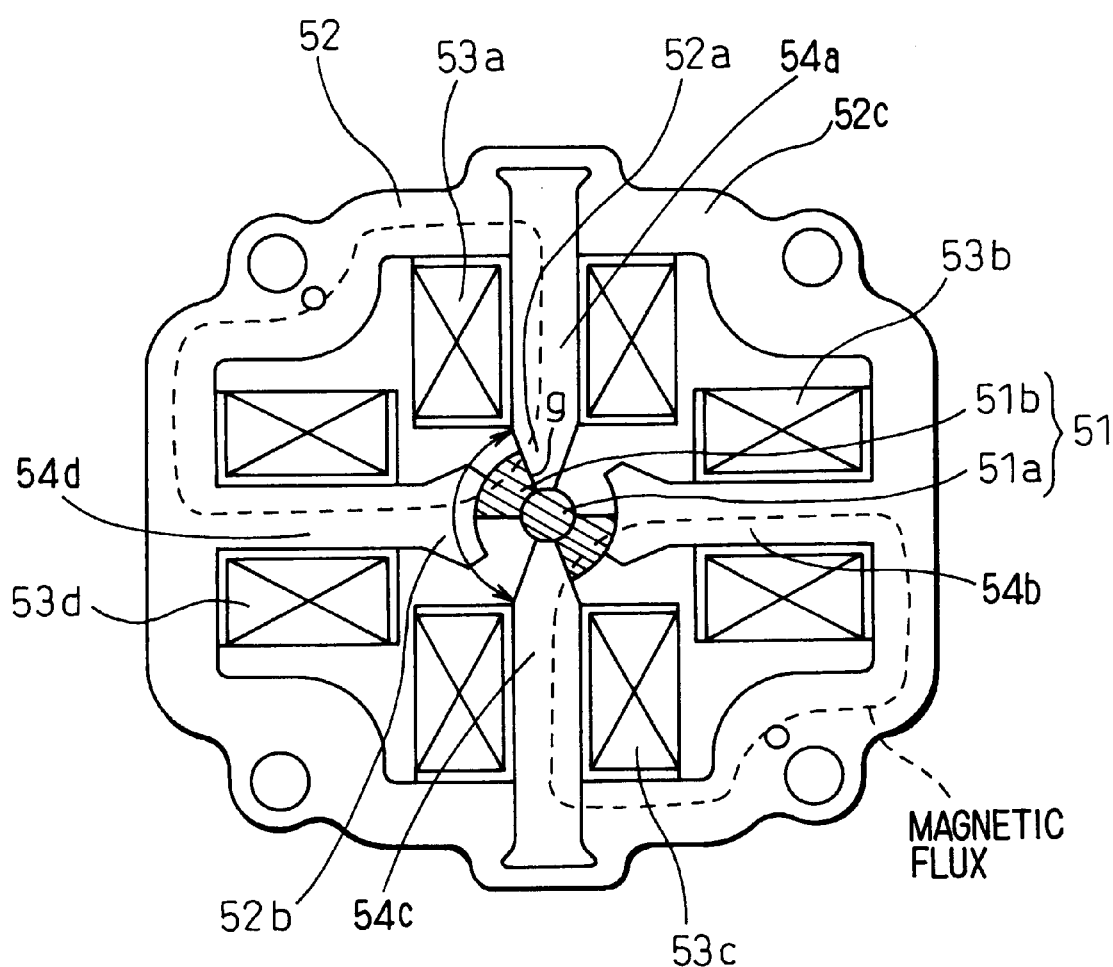
FIG. 3 is a sectional view showing a rotary solenoid actuator of the intake control device according to the first embodiment of the present invention.

The R/S actuator 50 comprises a rotor 51 and a stator 52 that is made of a ferromagnetic material. As shown in FIG. 3, the rotor 51 is integrally constructed with a solid rod-shaped part 51a and two fan-shaped parts 51b. The rod-shaped part 51a has a circular cross-section and is connected with the support shaft 42 of the intake control valve 40. The fan-shaped parts 51b are made of a ferromagnetic material and have fan-shaped cross-sections. The fan-shaped parts 51b are disposed symmetrically across the axial center of the rod-shaped part 51a on the outer peripheral surface of the rod-shaped part 51a, the fan-shaped parts 51b extending along the rod-shaped part 51a. The stator 52 has a housing part 52c and four arms 54a, 54b, 54c, 54d that are formed on the inner surface of the housing part 52c toward the axis of the rotor 51. The arms 54a, 54b, 54c, 54d are disposed in four radial directions from the axis of the rotor 51 in an interval of generally 90 degrees. Four electromagnetic coils 53a, 53b, 53c, .53d are wound around the arms 54a, 54b, 54c, 54d respectively in that order. Front ends of the arms 54a, 54c, which are disposed opposite to each other across the rotor 51, are tapered. Thus, a pair of projecting parts 52a are formed on the front ends of the arms 54a, 54c. On the other hand, front ends of the arms 54b, 54d, which are disposed opposite to each other across the rotor 51, are formed with a pair of extending parts 52b. The head of the extending part 52b is formed with a concave arc-shaped surface having a shape corresponding to the convex arc-shape of the fan-shaped part 51b.

The inner peripheral surfaces of the front ends of the projecting parts 52a face the outer peripheral surface of the rod-shaped part 51a. The inner peripheral surfaces of the front ends of the extending parts 52b face the outer peripheral surfaces of the fan-shaped parts 51b across radial air gaps respectively. The fan-shaped part 51b in the arm 54b side is referred to as the first fan-shaped part 51b hereafter, and the other fan-shaped part 51b in the arm 54d side is referred to as the second fan-shaped part 51b hereafter.

The intake control valve 40 is closed fully when one side of the second fan-shaped part 51b contacts one side of the projecting part 52a of the arm 54a in a circumferential direction as shown in FIG. 3. Meanwhile, one side of the first fan-shaped part 51b contacts one side of the projecting part 52a of the arm 54c in the circumferential direction as shown in FIG. 3. On the other hand, the intake control valve 40 is opened fully when the other side of the second fan-shaped part 51b contacts the other side of the projecting part 52a of the arm 54c in the circumferential direction. Meanwhile, the other side of the first fan-shaped part 51b contacts the other side of the projecting part 52a of the arm 54a in the circumferential direction. During a transitional period of the intake control valve 40 between a full closing position and a full opening position, four air gaps "g", or circumferential air gaps, are formed between the respective sides of the fan-shaped parts 51b and the respective sides of the projecting parts 52a in the circumferential direction. The circumferential length of the air gap "g" between the second fan-shaped part 51b and the projecting part 52a of the arm 54a is shortened when the rotor 51 is rotated to a direction to close the intake control valve 40. Likewise, the circumferential length of the air gap "g" between the first fan-shaped part and the projecting part 52a of the arm 54c is shortened when the rotor 51 is rotated to a direction to close the intake control valve 40. On the other hand, the circumferential length of the air gap "g" between the second fan-shaped part 51b and the projecting part 52a of the arm 54c is shortened when the rotor 51 is rotated to a direction to open the intake control valve 40. Likewise, the circumferential length of the air gap "g" between the first fan-shaped part 51b and the projecting part 52a of the arm 54a is shortened when the rotor 51 is rotated to a direction to open the intake control valve 40. Thus, the rotor 51 rotates in a range of generally 90 degrees, wherein the range is determined by the projecting parts 52a and the fan-shaped parts 51b.

Figure 4A:
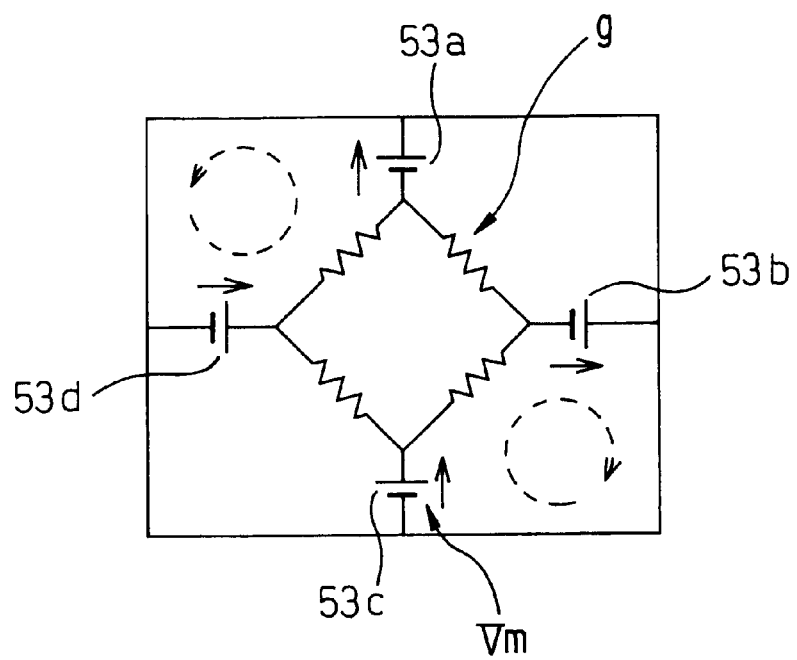
FIG. 4A is a diagram showing a magnetic circuit model of the rotary solenoid actuator in which a rotor is held at a full closing position, according to the first embodiment of the present invention.

In FIG. 4A, $V_m$ represents a magnetomotive force provided by the electromagnetic coil and "g" represents a magnetic resistance provided by the air gap "g". If directions of current flowing through the four electromagnetic coils 53a, 53b, 53c, 53d are set in correspondence with a magnetic circuit shown in FIG. 4A, magnetic flux circulating counterclockwise is generated in the upper left quarter part in FIG. 4A, and the magnetic flux runs through the air gap "g" between the second fan-shaped part 51b and the projecting part 52a of the arm 54a. Likewise, magnetic flux circulating clockwise is generated in the lower right quarter part in FIG. 4A, and the magnetic flux runs through the air gap "g" between the first fan-shaped part 51b and the projecting part 52a of the arm 54c. At that time, no magnetic flux is generated in the upper right quarter part and the lower left quarter part in FIG. 4A. Therefore, when the magnetic circuit is set as shown in FIG. 4A, attracting forces are generated between the second fan-shaped part 51b and the projecting part 52a of the arm 54a and between the first fan-shaped part 51b and the projecting part 52a of the arm 54c. Accordingly, the attracting forces shorten the air gap "g" between the second fan-shaped part 51b and the projecting part 52a of the arm 54a and the air gap "g" between the first fan-shaped part 51b and the projecting part 52a of the arm 54c. As a result, the rotor 51 is rotated from the neutral position to the full closing position and is held there.

Figure 4B:
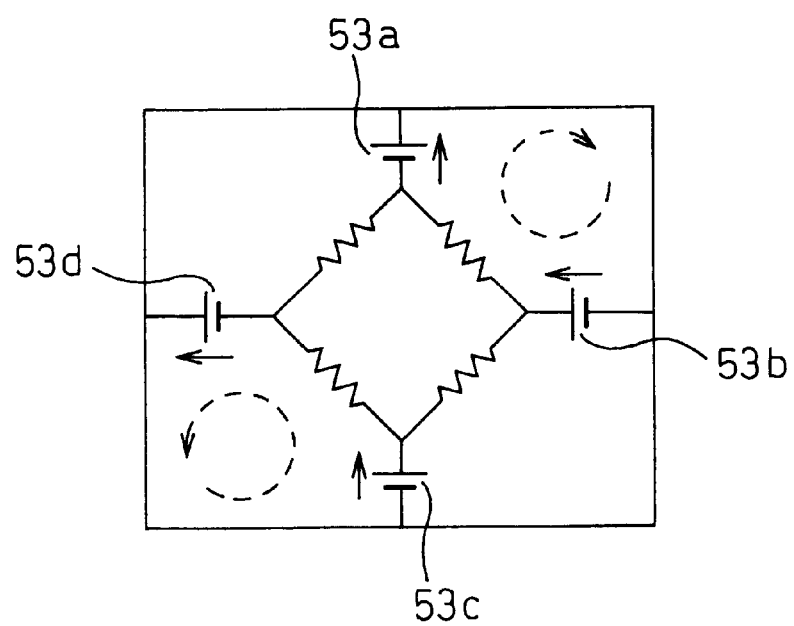
FIG. 4B is a diagram showing a magnetic circuit model of the rotary solenoid actuator in which the rotor is held at a full opening position, according to the first embodiment of the present invention.

In FIG. 4B, the directions of the current supplied to the electromagnetic coils 53b, 53d are opposite to the directions in the case shown in FIG. 4A. If the directions of the current flowing through the four electromagnetic coils 53a, 53b, 53c, 53d are set in correspondence with another magnetic circuit shown in FIG. 4B, magnetic flux circulating counterclockwise is generated in the lower left quarter part in FIG. 4B, and the magnetic flux runs through the air gap "g" between the second fan-shaped part 51b and the projecting part 52a of the arm 54c. Meanwhile, magnetic flux circulating clockwise is generated in the upper right quarter part in FIG. 4B, and the magnetic flux runs through the air gap "g" between the first fan-shaped part 51b and the projecting part 52a of the arm 54a. No magnetic field is generated in the upper left quarter part and the lower right quarter part in FIG. 4B. Therefore, when the magnetic circuit is set as shown in FIG. 4B, attracting forces are generated between the second fan-shaped part 51b and the projecting part 52a of the arm 54c and between the first fan-shaped part 51b and the projecting part 52a of the arm 54a. Accordingly, the attracting forces shorten the air gap "g" between the second fan-shaped part 51b and the projecting part 52a of the arm 54c and the air gap "g" between the first fan-shaped part 51b and the projecting part 52a of the arm 54a. As a result, the rotor 51 is rotated from the neutral position to the full opening position and is held there.

Thus, the rotor 51 is rotated from the neutral position and is held at the full closing position or at the full opening position in correspondence with the direction of the current supplied to the pair of the electromagnetic coils 53b, 53d. Likewise, the intake control valve 40 is rotated from the neutral position and is held at the full closing position or at the full opening position.

And thus, the projecting part 52a of the stator 52 and the fan-shaped part 51b of the rotor 51 attract and stick to each other directly in the direction of the rotation of the rotor 51 when the electromagnetic coils 53a, 53b, 53c, 53d are supplied with the current. As a result, the response of the intake control valve 40 is improved and the power consumption is reduced.

The R/S actuator 50 has a plurality of electromagnetic actuator units. Each unit has one fan-shaped part 51b, one extending part 52b as a supplying pole, one projecting part 52a as an attracting pole, and one of the electromagnetic coils 53a, 53b, 53c, 53d.

The fan-shaped part 51b is outwardly extending from the rod-shaped part 51a. The fan-shaped part 51b has an outer surface, upper and lower axial ends, and a side end.

The extending part 52b faces the outer surface. The facing area between the extending part 52b and the outer surface is decreased as the rotor 51 rotates toward a direction from the neutral position.

The fan-shaped part 51b, specifically the outer surface, defines an imaginary circle with respect to the rotation axis of the rotor 51. The projecting part 52a is disposed within the imaginary circle so that the side end of the fan-shaped part 51b and the projecting part 52a are arranged to face each other in the rotational direction of the rotor 51. The side end and the projecting part 52a define a variable air gap therebetween. The air gap varies as the rotor 51 rotates.

The extending part 52b and the projecting part 52a are connected to form the stator 52. One of the electromagnetic coils 53a, 53b, 53c, 53d is disposed on a part of the stator 52 to generate magnetic flux passing through the extending part 52b, the projecting part 52a and the fan-shaped part 51b. The side end and the projecting part 52a enable the magnetic flux mainly to run along the rotational direction of the rotor 51.

In order to rotate the rotor 51 in two directions, the embodiment has at least two units of the fan-shaped part 51b, the extending part 52b, the projecting part 52a and one of the electromagnetic coil 53a, 53b, 53c, 53d. At least one of the fan-shaped part 51b, the extending part 52b, and the projecting part 52a may be joined and commonly used for the units. For instance, in the embodiment, four units are arranged by two of the fan-shaped parts 51b, two of the extending parts 52b, two of the projecting parts 52a and four of the electromagnetic coils 53a, 53b, 53c, 53d.

Figure 5:
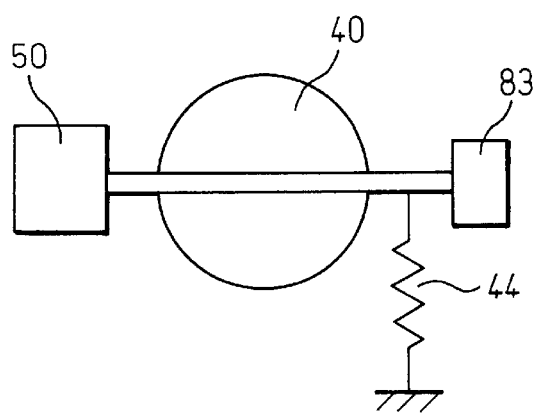
FIG. 5 is a schematic diagram showing the intake control device according to the first embodiment of the present invention.

As shown in FIG. 5, the intake control device 4 comprises the intake control valve 40, the R/S actuator 50, the spring 44 and the opening degree sensor 83. The R/S actuator 50 is operated as a holding force generating means that holds the intake control valve 40 at the full opening position or at the full closing position. The spring 44 returns the intake control valve 40 to the neutral position and improves the response. The opening degree sensor 83 is used when the opening degree of the intake control valve 40 is controlled. The opening degree of the intake control valve 40 is controlled by changing the quantity of the current flowing through the electromagnetic coils, wherein the current is controlled in a feed back control with the signals from the opening degree sensor 83. The opening degree of the intake control valve 40 is controlled especially when the intake control valve 40 needs to be held with a partial opening, for instance, when the engine 1 is idling.

Figure 6:
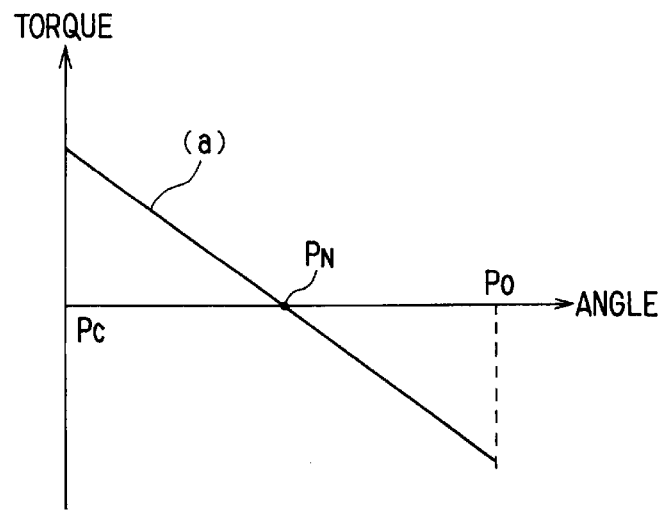
FIG. 6 is a graph showing torque characteristics of a spring according to the first embodiment of the present invention.

FIG. 6 is a graph showing torque characteristics of the spring 44. A slope of a line (a) in FIG. 6 represents a spring constant of the spring 44. In FIG. 6, the horizontal axis represents a rotational angle of the intake control valve 40, and $P_C$, $P_N$ and $P_O$ represent angles corresponding to the full closing position, the neutral position and the full opening position respectively. The slope of the line (a) is increased by choosing the spring constant of the spring 44 properly, and the response of the intake control valve 40 is improved.

Figure 7:
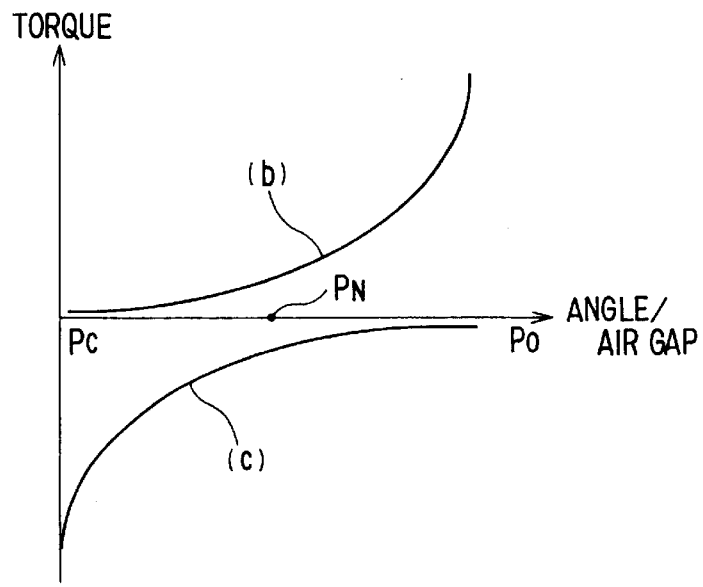
FIG. 7 is a graph showing toque characteristics of the rotary solenoid actuator according to the first embodiment of the present invention.
Figure 8A:
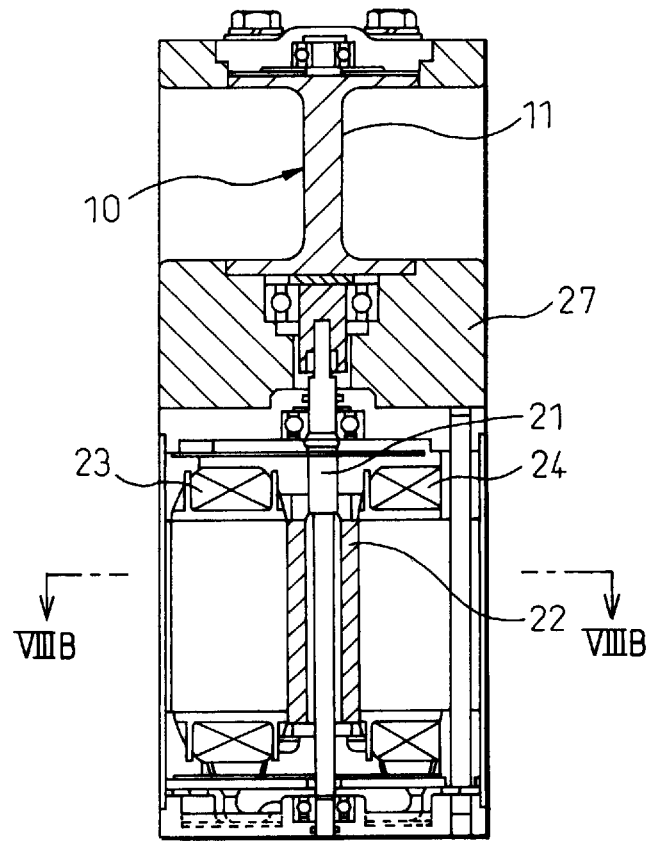
FIG. 8A is a longitudinal sectional view showing a conventional intake control device.
Figure 8B:
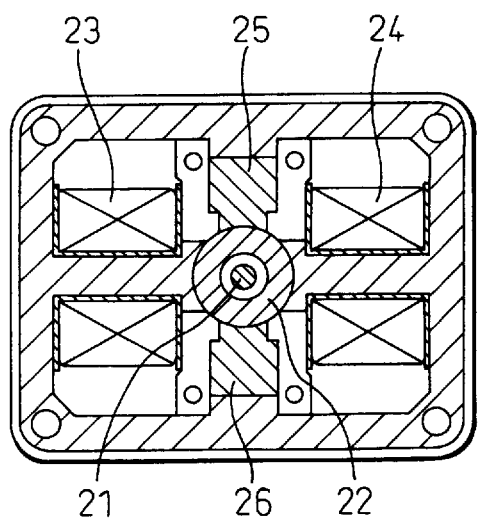
FIG. 8B is a view in section along the line VIIIB—VIIIB in FIG. 8A showing the conventional intake control device.

FIG. 7 is a graph showing torque characteristics of the R/S actuator 50. A line (c) in the lower part of FIG. 7 represents the torque characteristics when the electromagnetic coils 53a, 53b, 53c, 53d are supplied with current in correspondence with the magnetic circuit shown in FIG. 4A. A line (b) in the upper part of FIG. 7 represents the torque characteristics when the electromagnetic coils 53a, 53b, 53c, 53d are supplied with current in correspondence with the magnetic circuit shown in FIG. 4B. The horizontal axis represents angle of the intake control valve 40 or the circumferential length of the air gap "g" between the second fan-shaped part 51b and the projecting part 52a of the arm 54a. $P_C$, $P_N$ and $P_O$ represent angles of the intake control valve 40 or the circumferential length of the air gap "g" corresponding to the full closing position, the neutral position and the full opening position of the intake control valve 40 respectively. Generally, an attracting force $F_a$ generated by supplying current to a coil is explained by an equation (1) below, wherein "a" is a constant and "x" represents length of the air gap "g".

$$F_a = a \times (1/x^2) \qquad (1)$$

Accordingly, the attracting force $F_a$ is inversely proportional to "$X^2$" and sharply increases as the air gap length "x" of the air gap "g" decreases. Therefore, the rotor 51 can be held at the full closing position or at the full opening position with a small holding current supplied to the electromagnetic coils. The opening degree of the intake control valve 40 is regulated by controlling the current supplied to the electromagnetic coils and balancing the force of the spring and the attracting force $F_a$.

When the electromagnetic coils 53a, 53b, 53c, 53d of the R/S actuator 50 are supplied with current in the directions as shown in FIG. 4A, attracting force $F_a$ overcomes the torque applied by the spring 44. Accordingly, the rotor 51, which has been held at the neutral position by the spring 44, is rotated and is held at the full closing position. Meanwhile, the circular valve plate 41 of the intake control valve 40 connected with the rotor 51 is rotated from the neutral position and is held at the full closing position. If the current supply to the electromagnetic coils 53a, 53b, 53c, 53d of the R/S actuator 50 is stopped, the rotor 51 and the circular valve plate 41 are rotated by the torque applied by the spring 44, and the rotor 51 and the circular valve plate 41 approach to the respective full opening positions. However, the rotor 51 and the circular valve plate 41 do not reach the full opening positions because of friction, viscous resistance and the like. If the electromagnetic coils 53a, 53b, 53c, 53d are supplied with current in the directions corresponding to the magnetic circuit shown in FIG. 4B when the rotor 51 approaches to the full opening position, the rotor 51 is attracted and is held at the full opening position. Accordingly, the circular valve plate 41 is also held at the full opening position.

Thus, the quantity of the intake air drawn into each cylinder of the engine is controlled by regulating the opening degree of the intake control valve 40 or by changing the directions of the current supplied to the electromagnetic coils 53b, 53d repeatedly at desired timing. In the operations of the intake control valve 40 between the full closing position and the full opening position, the torque of the R/S actuator 50 is needed only when the rotor 51 is near the full closing position or near the full opening position. In addition, the air gap "g" provided by the rotor 51 and the stator 52 has a variable air gap structure. Therefore, large torque, or a large attracting force, is generated near the full closing position or the full opening position of the rotor 51. Accordingly, it is not needed to supply large current to the R/S actuator 50. Thus, the current supply to the R/S actuator is reduced and the power consumption is reduced.

Moreover, the response of the intake control valve 40 is improved by choosing the spring constant of the spring 44 properly.

The ECU 5 provides a current control means for controlling current supplied to the electromagnetic coils 53a, 53b, 53c, 53d. The current control means varies the current at least in an on-off manner to operate the R/S actuator 50.

The current control means varies the current in a linear manner in accordance with a position of the intake control valve 40.

In case of that the full closing position or the full opening position is the target position, the current control means decreases current as the actual position of the valve approaches to the target position. According to the arrangement of the embodiment, less torque is required as the rotor 51 approaches to the full opening or full closing position, because the air gap "g" is decreased as the rotor 51 approaches to the full opening or full closing position. For example, in a case of rotating the valve from the full closing position to the full opening position, the current control means decreases the current as the intake control valve 40 approaches to the full opening position.

The current control means varies the current in accordance with status of the intake control valve 40.

The current control means supplies less current when the intake control valve 40 is kept at the full opening or full closing position in comparison to the current when the intake control valve 40 is rotated toward the target position.

Second Embodiment

In the second embodiment, a full opening control of an intake control valves and an opening and closing control of the same after overlapping periods are explained. The controls are performed by an intake control system employing the same intake control devices as the first embodiment.

An intake control system employing the intake control devices 4 performs a full opening control under the operation of the ECU 5 when the engine 1 starts or when the engine revolves fast under a heavy load. In the full opening control, the intake control valves 40 are controlled to the full opening position. On the other hand, when the engine 1 is operating in a manner other than starting or revolving fast, the intake control system performs an opening and closing control. In the opening and closing control, the intake control valves 40 are opened and closed per each cylinder 1a, 1b, 1c, 1d in phase with the rotation of the engine. More specifically, in the opening and closing control, the intake control valve 40 is opened and closed in phase with an opening and closing of the intake valve of each cylinder.

When the engine revolves fast under a heavy load, the intake valves of the respective cylinders 1a, 1b, 1c, 1d are opened and closed properly by the high-speed cams without increasing pumping loss or generating back flow of the intake air. Therefore, the opening and closing control of the intake control valve 40 is not needed. When the engine starts, the full opening control is performed to hold the intake control valve 40 at the full opening position continuously to ensure the starting efficiency of the engine.

On the other hand, when the engine is operating under a partial load, the intake control valve 40 is closed before the intake valve closes, in order to regulate the quantity of the intake air.

Figure 9:
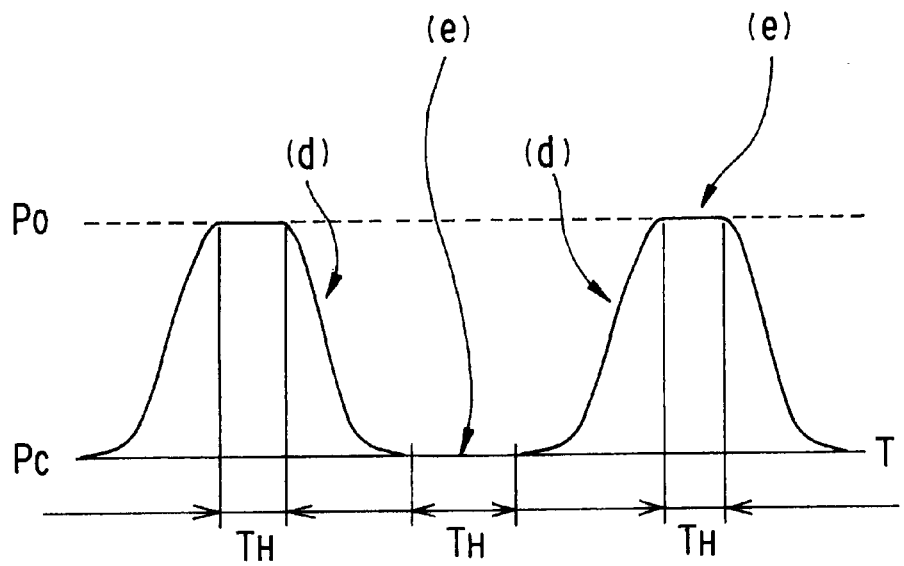
FIG. 9 is an explanatory diagram showing an opening and closing operation of an intake control valve according to a second embodiment of the present invention.

FIG. 9 is an explanatory diagram showing an opening and closing operation of the intake control valve 40 of the intake control device 4. In FIG. 9, the horizontal axis represents time and $T_H$ represents a period in which the intake control valve 40 is held. The vertical axis represents the opening degree of the intake control valve 40, and $P_O$ and $P_C$ represent the full opening position and the full closing position of the intake control valve 40 respectively. In the line representing the operation of the intake control valve 40, curving portions (d) represent regions in which the intake control valve 40 is operated by force of the spring 44 and the R/S actuator 50, and horizontal potions (e) represent regions in which the intake control valve 40 is held by the R/S actuator 50. In the operation of the intake control valve 40 shown in FIG. 9, periods of retaining the intake control valve 40 at the full opening position and at the full closing position are controlled by changing the duration of the current supply to the R/S actuator 50.

Figure 10:
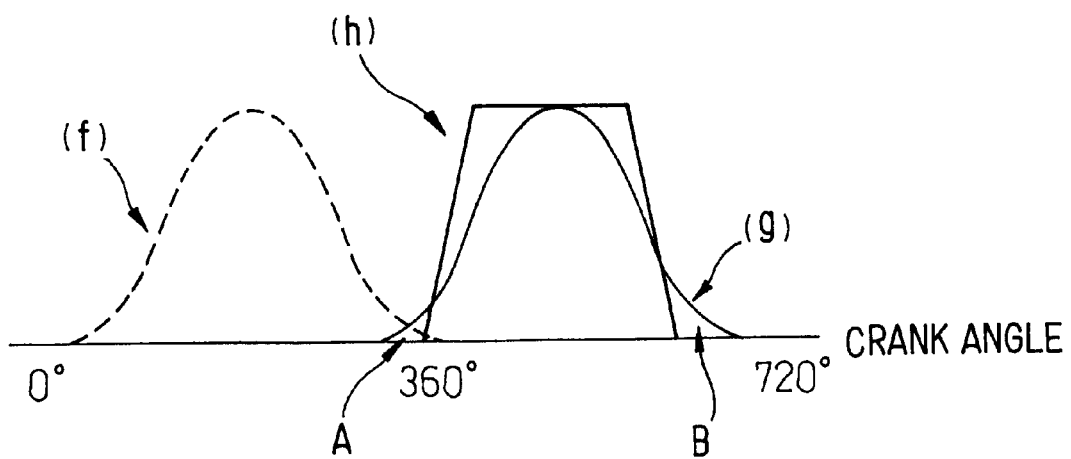
FIG. 10 is an explanatory diagram showing timing of the opening and closing operation of the intake control valve according to the second embodiment of the present invention.

FIG. 10 is an explanatory diagram showing timing of the opening and closing operation of the intake control valve 40 of the intake control device 4. In FIG. 10, the horizontal axis represents a crank angle. A broken line (f) represents the operation of the exhaust valve and a solid line (g) represents the operation of the intake valve. The other solid line (h) represents the operation of the intake control valve 40. The intake control valve 40 opens at the timing after a period of valve overlapping shown by an area "A" in FIG. 10. The valve overlapping occurs in the beginning of the intake stroke of the internal combustion engine 1. In the valve overlapping, the intake valve and the exhaust valve are open at the same time. More specifically, the intake control valve 40 is rotated from the full closing position to the full opening position at the same time with the closing of the exhaust valve, and the intake control valve 40 is held at the full opening position as shown by the line (h) in FIG. 10. Therefore, exhaust gas, combusted gas, in the cylinder or in the exhaust passage 3 is prevented from flowing back to the intake passage 2.

In addition, the intake control valve 40 is rotated from the full opening position to the full closing position before the intake valve is closed, and the intake control valve 40 is held at the full closing position. Thus, spit back of fresh air that could occur in an area "B" in FIG. 10 is prevented and development of pumping loss is reduced. The spit back of fresh air is a phenomenon in which the fresh air is returned to the intake passage 2 when the pressure in an intake port becomes negative.

Thus, the intake control device 4 according to the embodiment is capable of controlling the intake control valve 40 with characteristics in the opening timing and the closing timing of the intake control valve 40. More specifically, the intake control valve 40 is opened after the overlapping period and is closed before the intake valve closes.

And thus, the opening and closing timing of the intake control valve 40 of each cylinder is capable of being regulated to prevent the back flow of the exhaust gas and the spit back of fresh air.

Third Embodiment

In the third embodiment, an opening and closing control of intake control valves is explained, wherein the accuracy of the control timing is improved by correcting command timing by detection signals. The control is performed by an intake control system having a system architecture similar to that of the first embodiment.

Figure 11:
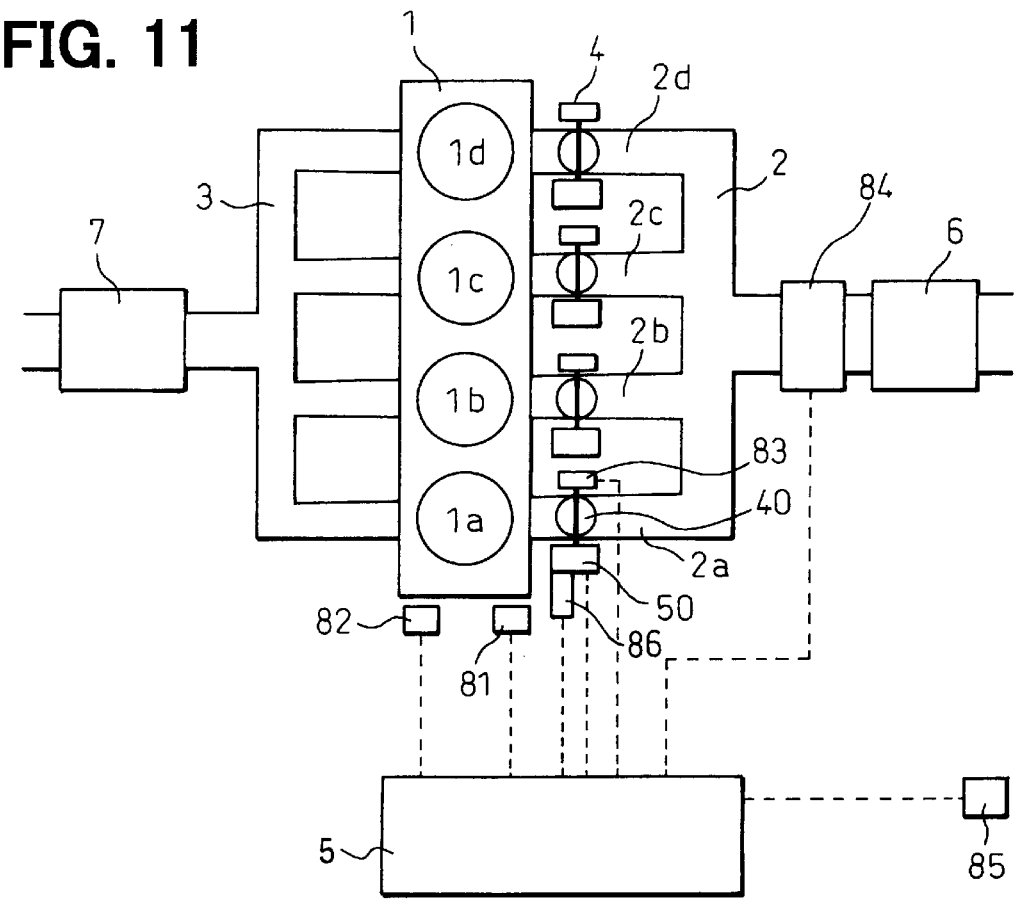
FIG. 11 is an explanatory diagram showing a system architecture of an internal combustion engine employing an intake control system according to a third embodiment of the present invention.

An intake control system according to the third embodiment further comprises a coil temperature sensor 86 as shown in FIG. 11. The coil temperature sensor 86 detects temperature of the electromagnetic coil of the R/S actuator 50. Detection signals from the coil temperature sensor 86 are outputted to the ECU 5.

The ECU 5 further comprises a map for target operation timing of the intake control valves 40 in correspondence with the operating conditions of the engine 1. The ECU 5 receives various information on the actual operating conditions of the engine 1 through respective sensors, and corrects the information by comparing the actual information with various values on the map, and outputs eventual command timing.

The opening and closing control of the intake control device 4 of which command timing is corrected is explained below based on FIGS. 12 to 14.

Figure 12:
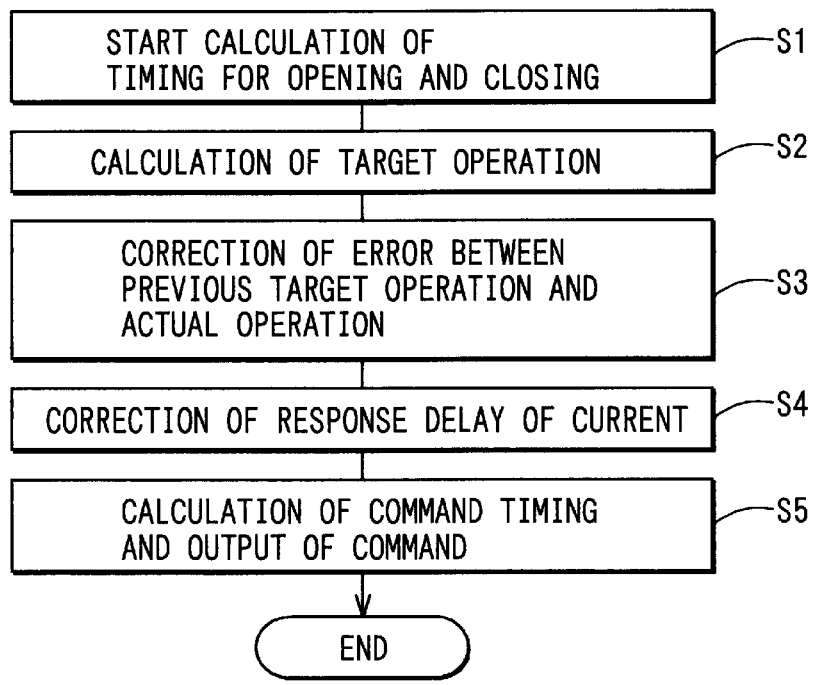
FIG. 12 is a flow chart of a correction processing of an opening and closing operation of an intake control valve of the intake control system according to the third embodiment of the present invention.

As shown in FIG. 12, if a timing calculation of the opening and closing operation of the intake control valve 40 is started in a step S1, an accelerator opening degree and rotation speed of the engine are calculated based on signals inputted to the ECU 5 from the accelerator opening degree sensor 85 and the crank angle sensor 81 in a step S2. The ECU 5 calculates the target operation timing of the intake control valve 40 from the map in accordance with the operating conditions of the engine 1.

Next, in a step S3, the ECU 5 calculates error from the previous target operation timing calculated in the step S2 and actual operation timing detected by the opening degree sensor 83 disposed in the intake control valve 40 and corrects the operation timing of the control valve 40.

In a step S4, the ECU 5 calculates response delay of the current caused by changes of coil resistance and inductance, based on information provided by the coil temperature sensor 86 disposed in the R/S actuator 50, and corrects the response delay. Thus, delay of the operation timing of the intake control valve 40 is corrected, wherein the delay of the operation is caused because torque generated by the R/S actuator changes in correspondence with the coil temperature.

In a step S5, timing of a command of the next opening and closing operation is calculated by adding correction calculated in the steps S3 and S4 to the target operation timing calculated in the step 2, and the command is outputted based on the calculated timing of the command. Thus, the actual operation timing is synchronized with the target operation timing.

Figure 13:
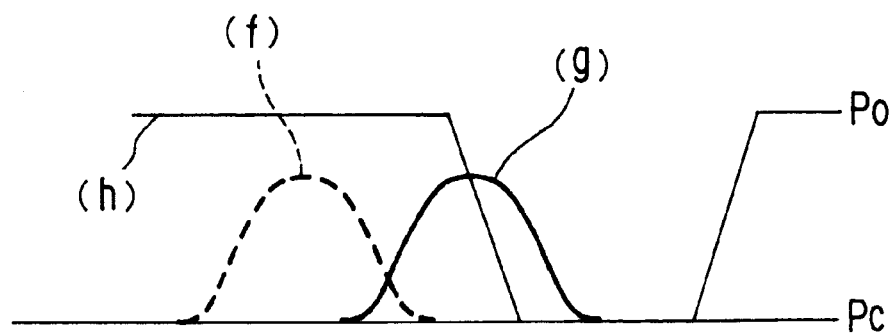
FIG. 13 is a timing chart showing operations of the intake control valve, an intake valve and an exhaust valve according to the third embodiment of the present invention.

In FIG. 13, a broken line (f) represents an operation of the exhaust valve and a solid line (g) represents an operation of the intake valve, and another solid line (h) represents an operation of the intake control valve 40. The vertical axis represents opening degree of the valves. $P_O$ represents the full opening position and $P_C$ represents the full closing position of the inlet control valve 40. As shown in FIG. 13, the opening and closing operation of the intake control valve 40 is performed once in a cycle of the engine. More specifically, the intake control valve 40 is driven from the full opening position to the full closing position while the intake valve of the cylinder is open, and the intake control valve 40 is driven from the full closing position to the full opening position while both of the intake valve and the exhaust valve of the cylinder are close.

Figure 14:
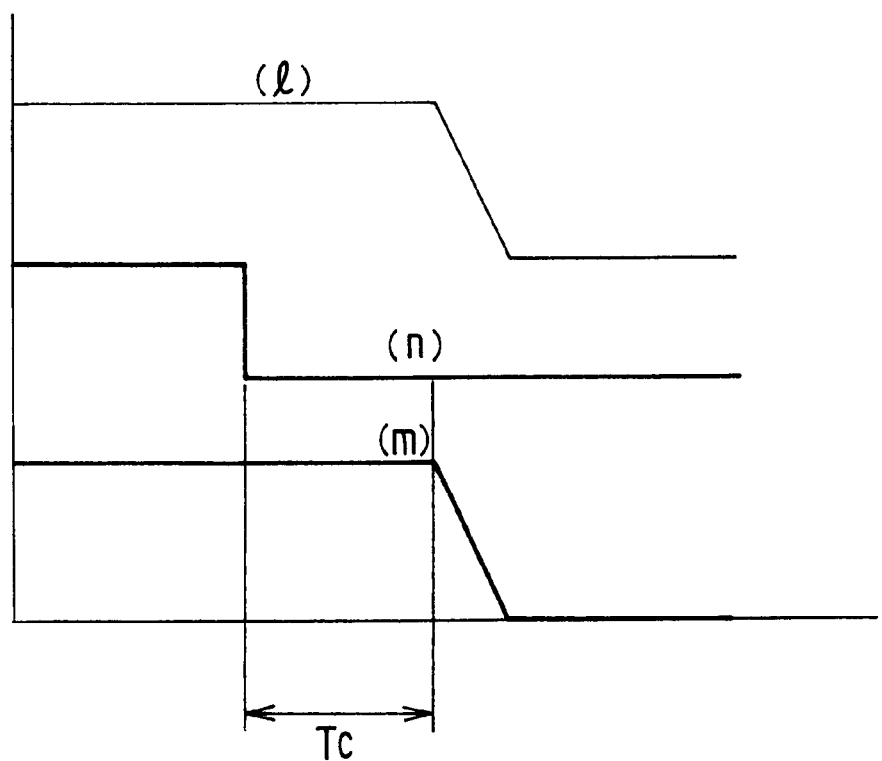
FIG. 14 is an explanatory diagram showing correction processing of opening and closing timing of the intake control valve according to the third embodiment.

In FIG. 14, a solid line (l) represents the target operation timing of the intake control valve 40 and another solid line (m) represents the actual operation timing of the intake control valve 40. The other solid line (n) represents a command value. As shown in FIG. 14, the corrections based on the error and the change of the coil temperature are added in period $T_C$ so that the actual operation timing is synchronized with the target operation timing. In this case, the operation command should be outputted ahead of time in consideration of a certain level of delay in the operation.

In the embodiment, the intake control system, which is capable of controlling quantity of air to draw during each cycle of the engine, has the opening degree sensor 83 and the coil temperature sensor 86 as explained above. Therefore, the intake control system is capable of learning variation in the operation timing of the intake control valve 40 and is capable of correcting the next operation timing of the intake control valve 40. Thus, the controlling accuracy of the operation timing is improved. As a result, the fuel consumption is reduced and the output of the engine 1 is improved.

Moreover, the intake control system is not provided with a main control valve to control the entire intake air. The intake control system is provided with the intake control valves 40 disposed in the respective cylinders. Therefore, the intake control system is capable of controlling the intake air precisely per each cylinder.

Fourth Embodiment

In the fourth embodiment, two-step opening and closing control of intake control valves is explained. The control is performed by an intake control system employing the same intake control device as the first embodiment.

Figure 15:
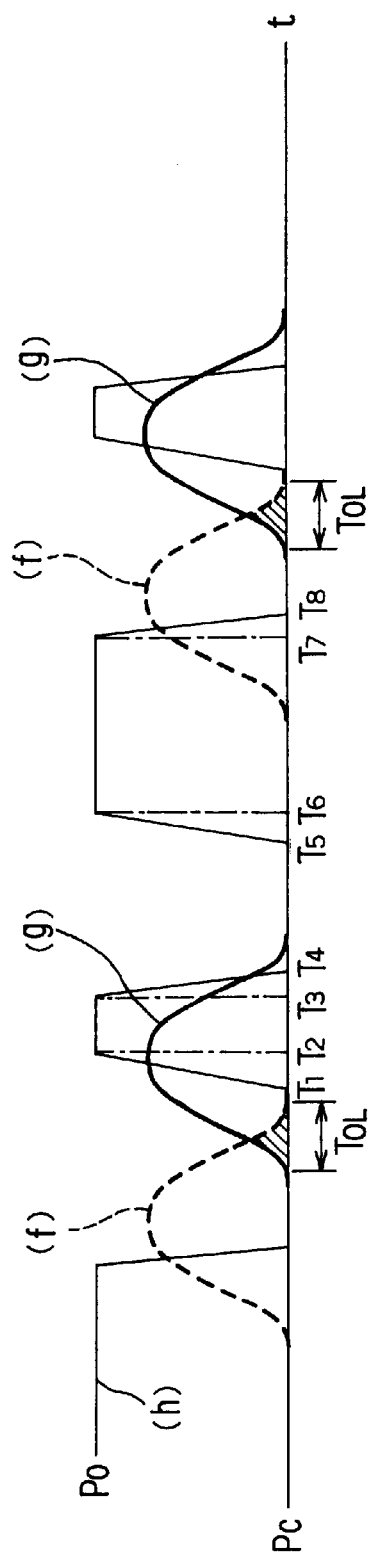
FIG. 15 is an explanatory diagram showing an opening and closing operation of an intake control system according to a fourth embodiment of the present invention.
Figure 16:
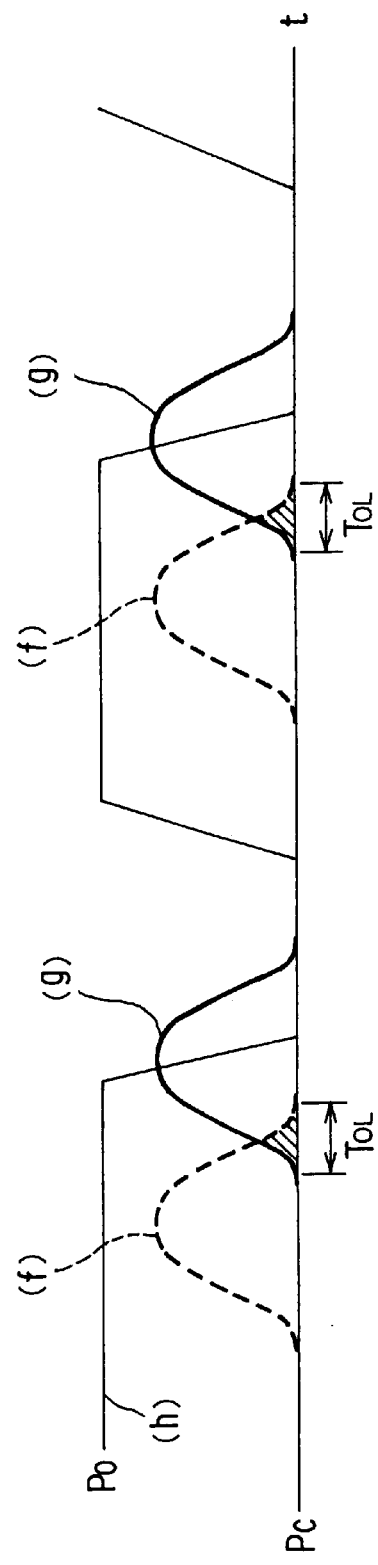
FIG. 16 is an explanatory diagram showing an opening and closing operation of a conventional intake control system.

The two-step opening and closing control performed by the intake control system is explained based on FIG. 15. In FIG. 15, a broken line (f) represents an operation of the exhaust valve and a solid line (g) represents an operation of the intake valve, and another solid line (h) represents an operation of the intake control valve 40. In FIG. 15, the vertical axis represents opening degree of the valves. $P_O$ represents the full opening position and $P_C$ represents the full closing position of the intake control valve 40. The horizontal axis in FIG. 15 represents time.

In an intake stroke of the engine 1, the intake control valve 40 is driven from the full closing position at $T_1$ after an overlapping period $T_{OL}$ ends, and the intake control valve 40 reaches the full opening position at $T_2$. In the overlapping period $T_{OL}$, the exhaust valve and the intake valve are open at the same time. After the intake control valve 40 is held at the full opening position and necessary intake air is drawn into the cylinder, the intake control valve 40 is driven from the full opening position at $T_3$ and reaches the full closing position at $T_4$ before the intake valve is closed. The operation from $T_1$ to $T_4$ is the first opening and closing control of the intake control valve 40.

In this case, the pumping loss is reduced, since the intake control valve 40 is driven to the full closing position before the intake valve is closed. On the other hand, since the intake valve is closed after the intake control valve 40 is fully closed, pressure in a dead volume part that is an intake manifold part provided between the intake control valve 40 and the intake valve becomes negative. If the negative pressure is left, the pumping loss could increase in the next intake stroke.

Therefore, in the embodiment, after the intake valve closes, the intake control valve 40 is driven from the full closing position at $T_5$ and the intake control valve 40 reaches the full opening position at $T_6$ again so that the pressure in the intake manifold, especially the pressure in the dead volume part, becomes the atmospheric pressure. After the intake control valve 40 is held at the full opening position, the intake control valve 40 is driven from the full opening position at $T_7$ and reaches the full closing position at $T_8$ again before the intake valve starts to open, and the state is retained. Therefore, the exhaust gas does not flow into the intake passage 2. The operation from $T_5$ to $T_8$ is the second opening and closing control of the intake control valve 40. Thus, in the embodiment, the first and second controls, the two-step control, of the intake control valve 40 are performed in a cycle of the engine 1.

As explained above, the intake control valve 40 is kept closed in the overlapping period in which the intake valve and the exhaust valve are open at the same time. Therefore, the exhaust gas does not flow back into the intake passage 2 and combustion is not deteriorated even when the engine 1 is operating under a light load. Accordingly, the fuel consumption is not increased. In addition, in order to prevent development of the negative pressure in the dead volume part, the intake control valve 40 is momentarily opened fully before the intake valve opens. Therefore, in the next intake period, the intake stroke is started with the atmospheric pressure. As a result, the pumping loss is reduced.

The present invention should not be limited to the disclosed embodiments, but may be implemented in many other ways without departing from the spirit of the invention.

What is claimed is:

1. An intake control system that is mounted in an internal combustion engine and controls quantity of intake air, the intake control system comprising:
   an intake control valve disposed in an intake passage of each cylinder of the engine;
   a rotary solenoid actuator that drives the intake control valve to open and to close in a direction corresponding to a direction of current supplied to the rotary solenoid actuator when the rotary solenoid actuator is supplied with the current; and
   a spring that is connected with a shaft of the intake control valve or a rotor of the rotary solenoid actuator and holds the intake control valve at a neutral position in which the intake passage is half opened when the rotary solenoid actuator is not supplied with the current,
   wherein the rotary solenoid actuator is constructed with a rotor made of a ferromagnetic material and a stator that is made of a ferromagnetic material and is disposed with a plurality of electromagnetic coils,
   wherein the rotor and the stator are disposed so that air gaps formed between the rotor and the stator change length thereof in a rotational direction of the rotor, and
   wherein the plurality of electromagnetic coils are disposed so that magnetic flux is generated mainly through the air gap formed from the rotor to a direction in which the rotor is to be rotated among the air gaps.

2. The intake control system as in claim 1, further comprising an opening degree sensor that is disposed on the shaft of the intake control valve and detects opening degree of the intake control valve.

3. The intake control system as in claim 1, wherein:
   the electromagnetic coils are disposed in four radial directions from the rotor in an interval of generally 90 degrees so that the electromagnetic coils generate magnetic flux mainly in a pair of quarter spaces in the stator when the electromagnetic coils are supplied with the current, the pair of spaces being opposite to each other across the rotor; and
   the spaces where the magnetic flux is generated are changed by altering the directions of the current supplied to the electromagnetic coils.

4. The intake control system as in claim 1, wherein:
   the rotor is integrally constructed with a solid rod-shaped part having a circular cross-section and a pair of fan-shaped parts that outwardly and symmetrically extend from the rod-shaped part and have fan-shaped cross-sections;
   the stator is formed with a pair of projecting parts disposed symmetrically across the rotor so that the projecting parts project toward the rotor, the projecting parts being capable of contacting respective sides of the fan-shaped parts of the rotor in circumferential directions; and
   the rotor is capable of rotating between the projecting parts in a range of generally 90 degrees.

5. The intake control system as in claim 1, wherein:
   the intake control system performs an opening control in which the intake control valve is rotated from a full closing position to a full opening position when an exhaust valve of the cylinder is closed, and the intake control valve is held at the full opening position;
   the intake control system performs a closing control in which the intake control valve is rotated from the full opening position to the full closing position before an intake valve of the cylinder is closed, and the intake control valve is held at the full closing position; and
   the intake control system performs the opening control and the closing control in that order in a cycle of the engine.

6. The intake control system as in claim 2, further comprising:
   a target operation timing calculating means that calculates target operation timing of the intake control valve from a map stored therein and based on opening degree of an accelerator and rotation speed of the engine;
   an actual operation detecting means that detects actual operation timing of the intake control valve by signals from the opening degree sensor disposed in the intake control valve; and
   an error correcting means that corrects an error between the target operation timing provided by the target operation timing calculating means and the actual operation timing provided by the actual operation timing detecting means, wherein the intake control system operates the intake control valve at the target operation timing, of which error is corrected, in a following operation of the intake control valve.

7. The intake control system as in claim 6, further comprising:

a coil temperature sensor that is disposed in the rotary solenoid actuator and detects temperature of the electromagnetic coil; and a coil temperature correcting means that calculates a response delay of current caused by changes of coil resistance and coil inductance, based on detection signals from the coil temperature sensor, wherein the response delay calculated by the coil temperature correcting means is added to the error between the target operation timing and the actual operation timing of the intake control valve.

8. The intake control system as in claim 1, wherein:

the intake control system performs a first opening and closing control in which the intake control valve is driven from a full closing position to a full opening position after an end of overlapping period of an intake valve and an exhaust valve of the cylinder, and the intake control valve is driven from the full opening position to the full closing position after necessary intake air is drawn, before the intake valve closes;

the intake control system performs a second opening and closing control in which the intake control valve is driven from the full closing position to the full opening position so that pressure in the intake passage becomes atmospheric pressure after the intake valve closes, and the intake control valve is driven from the full opening position to the full closing position before the intake valve opens; and the intake control system performs the first opening and closing control and the second opening and closing control in that order in a cycle of the engine.

9. An intake control system that is disposed in an internal combustion engine and controls quantity of intake air, the intake control system comprising:

an intake control valve disposed in a cylinder of the engine;

a rotary solenoid actuator that drives the intake control valve to open and to close in correspondence with a direction of current when the actuator is supplied with the current;

a spring that holds the intake control valve at a neutral position, in which the intake passage is half opened, when the actuator is not supplied with the current;

an opening degree sensor that is disposed in the intake control valve and detects opening degree of the intake control valve;

a target operation timing calculating means that calculates target operation timing of the intake control valve from a map stored therein and based on an opening degree of an accelerator and rotation speed of the engine;

an actual operation detecting means that detects actual operation timing of the intake control valve by signals from the opening degree sensor; and an error correcting means that corrects an error between the target operation timing provided by the target operation timing calculating means and the actual operation timing provided by the actual operation timing detecting means, wherein the intake control system operates the intake control valve at the target operation timing, of which error is corrected, in a following opening and closing operation of the intake control valve.

10. The intake control system as in claim 9, further comprising:

a coil temperature sensor that is disposed in the rotary solenoid actuator and detects temperature of an electromagnetic coil of the rotary solenoid actuator; and a coil temperature correcting means that calculates a response delay of current caused by changes of coil resistance and coil inductance, based on detection signals from the coil temperature sensor, wherein the response delay calculated by the coil temperature correcting means is added to the error between the target operation timing and the actual operation timing of the intake control valve.

11. An intake control system that is disposed in an internal combustion engine and controls quantity of intake air, the intake control system comprising:

an intake control valve disposed in a cylinder of the engine;

a rotary solenoid actuator that drives the intake control valve to open and to close in correspondence with a direction of current supplied to the rotary solenoid actuator when the rotary solenoid actuator is supplied with the current; and a spring that holds the intake control valve at a neutral position in which the intake passage is half opened when the actuator is not supplied with the current, wherein the intake control system performs a first opening and closing control in which the intake control valve is driven from a full closing position to a full opening position after an end of overlapping period of an intake valve and an exhaust valve of the cylinder, and the intake control valve is driven from the full opening position to the full closing position after necessary intake air is drawn, before the intake valve closes, wherein the intake control system performs a second opening and closing control in which the intake control valve is driven from the full closing position to the full opening position so that pressure in the intake passage becomes atmospheric pressure after the intake valve closes, and the intake control valve is driven from the full opening position to the full closing position before the intake valve opens, and wherein the intake control system performs the first opening and closing control and the second opening and closing control in that order in a cycle of the engine.

* * * * *

UNITED STATES PATENT AND TRADEMARK OFFICE
CERTIFICATE OF CORRECTION

PATENT NO. : 6,622,695 B2
DATED : September 23, 2003
INVENTOR(S) : Kondo

It is certified that error appears in the above-identified patent and that said Letters Patent is hereby corrected as shown below:

<u>Title page,</u>
Item [30], last priority data reference, change "Nov. 28, 2001" to -- Dec. 6, 2001 --.

Signed and Sealed this

Thirteenth Day of January, 2004

JON W. DUDAS
*Acting Director of the United States Patent and Trademark Office*